(12) United States Patent
Fuss

(10) Patent No.: US 6,213,230 B1
(45) Date of Patent: Apr. 10, 2001

(54) DRILLING TOOL ESPECIALLY FOR THE ROTARY PERCUSSION DRILLING OF PREFERABLY ROCK

(75) Inventor: Mathias Fuss, Weingarten (DE)

(73) Assignee: Hawera Probst GmbH, Ravensburg (DE)

( * ) Notice: Subject to any disclaimer, the term of this patent is extended or adjusted under 35 U.S.C. 154(b) by 0 days.

(21) Appl. No.: 09/186,186

(22) Filed: Nov. 5, 1998

(30) Foreign Application Priority Data

Nov. 6, 1997 (DE) ................................. 197 48 987

(51) Int. Cl.$^7$ ............................. E21B 10/40; B23B 41/00
(52) U.S. Cl. .................... 175/389; 175/381; 175/385; 175/405; 408/204; 408/224; 279/19.5
(58) Field of Search ........................... 175/389, 385, 175/402, 405, 388, 386, 381; 279/19, 19.5, 19.3; 408/226, 204, 206, 223–224

(56) References Cited

U.S. PATENT DOCUMENTS

| | | | |
|---|---|---|---|
| 981,899 | * | 1/1911 | Taylor ............................ 279/19 |
| 1,746,455 | * | 2/1930 | Woodruff et al. .............. 175/381 |
| 1,757,444 | * | 5/1930 | Stevens ......................... 279/19.5 |
| 1,796,487 | * | 3/1931 | Stevens ......................... 279/19 |
| 2,224,063 | * | 12/1940 | Roberts ........................ 279/19.5 |
| 4,202,557 | * | 5/1980 | Haussmann et al. .......... 279/19.5 |
| 4,512,692 | * | 4/1985 | Nielsen ......................... 408/226 |
| 4,565,472 | * | 1/1986 | Brennsteiner et al. ........ 408/226 |
| 5,368,421 | * | 11/1994 | Head ............................. 408/240 |
| 5,779,404 | * | 7/1998 | Jore .............................. 408/239 R |
| 5,788,430 | * | 8/1998 | Meyen et al. ................. 408/226 |
| 5,813,802 | * | 9/1998 | Ajimi et al. .................. 408/204 X |
| 5,971,403 | * | 10/1999 | Yahagi et al. ................. 279/19.3 |
| 5,988,953 | * | 11/1999 | Berglund et al. ............. 408/1 R |
| 6,116,827 | * | 9/2000 | Moser et al. .................. 175/385 X |

FOREIGN PATENT DOCUMENTS

| | | |
|---|---|---|
| 1992344 | 8/1968 | (DE) . |
| 2856205 | 7/1980 | (DE) . |
| 3322887A1 | 3/1985 | (DE) . |
| 8521577 | 5/1986 | (DE) . |
| 3614010A1 | 11/1987 | (DE) . |

* cited by examiner

*Primary Examiner*—Eileen D. Lillis
*Assistant Examiner*—Jong-Suk Lee
(74) *Attorney, Agent, or Firm*—Venable; George Spencer; Robert Kinberg

(57) ABSTRACT

A drilling tool, especially for the rotary percussion drilling of preferably rock, has a drilling body equipped toward the drilling side preferably with cutting bits, and with an axially arranged bore for receiving an exchangeable centering drill. In order to achieve axial movability and a reliable rotational takeup of the centering drill in the drilling tool, the drilling tool has a transverse bore which is arranged centrally relative to its drill longitudinal axis and into which can be inserted a bar-shaped or tubular holding means which centrally penetrates a corresponding recess on the shank of the centering drill so that the centering drill can be moved in the axial direction.

22 Claims, 5 Drawing Sheets

DRILLING TOOL ESPECIALLY FOR THE ROTARY PERCUSSION DRILLING OF PREFERABLY ROCK

BACKGROUND OF THE INVENTION

Figure 1A:
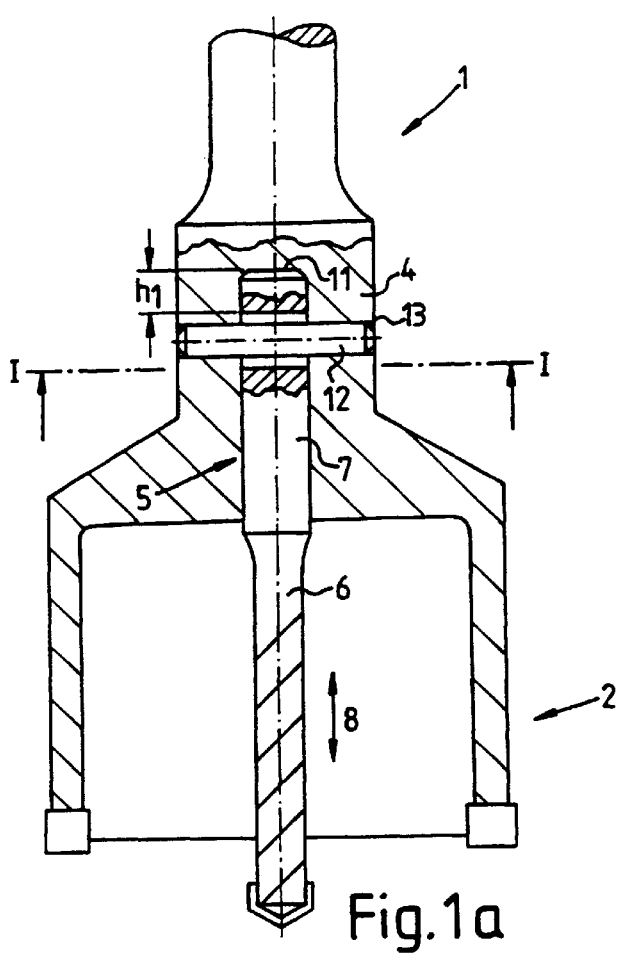

The invention relates to a drilling tool especially for the rotary percussion drilling of preferably rock.

Drilling tools and especially rock drills are used for making perforations in concrete or masonry and, in particular, are also designed for use in drilling hammers. To make relatively large perforations, so-called drill crowns, such as are represented by way of example in DE 3,322,887, are generally used. Such a drill crown consists of a pot-shaped housing with hard-metal cutting bits arranged on the end face. A concentrically inserted centering drill serves for centering, especially during the initial drilling of the rock material.

Furthermore, to make generally relatively small perforations, so-called perforation drills have become known, these generally consisting of a solid drill head, the drill shank being provided with an integral or separate conveying helix (DE 2,856,205 A1; DE 3,614,010 A1). The rock drill according to DE 2,856,205 having a pot-shaped cross-drilling head also has a separately insertable centering drill.

Both with drill crowns and with perforation drills having exchangeable centering drills, there is the problem of placing the centering drill securely, but also exchangeably in a bore in the drilling tool. For this purpose, this bore for receiving the centering drill is designed generally conically, in order to receive a likewise conical centering drill shank. However, exchange after a lengthy operation of the drilling tool may present problems, since the clamping effect of the conical faces is so great that the centering drill cannot be removed without further action. For this purpose, DE 3,322,887 provides, for example, a transverse bore, in which the end of the centering drill projects. The centering drill can then be pressed out by means of a separate tool. However, such a transversely extending recess at the end of the conical seat in the drill crown shank constitutes a disturbance of cross section which not only impairs the transmission of percussion movements but also adversely weakens the cross section of the tool shank.

Furthermore, DE 3,322,887 has, on the centering drill, a retaining element which is designed as a separate ring. However, this device serves merely to prevent the centering drill from falling out inadvertently. Normally, the centering drill is seated firmly in the drill crown as a result of the conical frictional connection.

A further known solution according to German Utility Model GM 1,992,344 provides for the centering drill of a drill crown to be fastened axially non-displaceably within the drill crown shank by means of a bayonet-like connection. For this purpose, the centering drill has, at the rear end of its chucking shank, a flattening which cooperates with a bolt located eccentrically in a transverse bore. An additional groove approximately perpendicular to the flattening is connected to the transverse bolt in the manner of a bayonet fastening by a rotation of the drill. The centering drill shank is thereby secured axially non-displaceably against falling out.

The general prior art also includes fixing the centering drill in a drill crown by means of a transverse screw. In this case, the centering drill is recessed in the drill longitudinal direction in the region of the penetrating screw, so that, where appropriate, an axial movement of the drill is allowed.

The subject of Utility Model DE-U1-85 21 577 also shows a drill crown, with an axially movable centering drill, laterally arranged setscrews projecting into the receiving bore for the centering drill. In this case, the centering drill is designed as a known "SDS drill" which has longitudinal grooves for separate rotational takeup as well as axial securing by means of elements which in each case are separate. Such a tool, admittedly, allows a cost-effective use of a known SDS drill. However, the mechanical outlay on the shank of the drill crown is considerable.

The disadvantage of the known solutions having an axially movable centering drill is also that, during rotary percussion drilling, the centering drill executes relative to the remaining tool longitudinal and rotational oscillating movements which, under high stress, lead to destruction of the holding means for the centering drill. In particular, for example, the thread of a transverse holding pin is destroyed relatively quickly as a result of these oscillations. Also, in the case of percussion stress with an axially displaceable centering drill, the multiplicity of individual parts used according to Utility Model GM 85 21 577 are exposed to high wear.

Furthermore, the fixed attachment of the centering drill, for example by means of a conical seat, has the disadvantage that the drilling capacity is markedly reduced, in comparison with an embodiment in which the centering drill can also be set in axial oscillating movement as a result of percussion stress.

SUMMARY OF THE INVENTION

The object on which the invention is based is to avoid the disadvantages of the previously explained prior art and, in particular, to provide a mounting for a centering drill in a drilling tool, which mounting is intended especially for rotary percussion use and has long service lives, easy exchangeability of the centering drill and an improved drilling capacity.

The invention is based on the essential notion that a drilling tool especially for the rotary percussion drilling of rock is to be provided in an advantageous way with an exchangeable centering drill which is designed as a wearing part. At the same time, the centering drill itself is to be mounted axially movably within its receiving bore, in order to be able to be subjected to percussion stress, according to the invention the centering drill being secured against falling out via a preferably bar-shaped or tubular holding element. For this purpose, there is located in the drilling tool a recess or bore which is arranged transversely to the axial drilling direction and into which the holding means penetrates symmetrically relative to the longitudinal axis of the drilling tool, viewed centrally or in cross section, and cooperates with a likewise central, preferably symmetrical recess on the centering drill shank, which recess completely passes through the latter, in such a way that, despite axial movability, the centering drill is prevented from falling out and, at the same time, rotational takeup is implemented. This constitutes an especially simple and cost-effective solution, since the bar-shaped or tubular holding means serves at the same time as a rotational takeup and axial securing of the centering drill. For the exchange of the pin-like holding means, the latter can easily be removed from the transverse bore. Because of the inventively continuous recess in the centering drill shank, which has, for example, the shape of a symmetrical slot or is formed by a bore which is larger by comparison with the cross section of the holding means, the centering drill can execute longitudinal oscillating movements in the axial direction relative to the remaining drilling tool. Owing to the central arrangement of the penetration on the centering drill shank, a weakening is certainly produced in the drill crown shank, but it is symmetrical and, by contrast with an asymmetrical weakening such as is the case in a range of known embodiments, it effects symmetrical profiles of impulsive force and/or shockwaves both in the drill crown shank and in the centering drill, with the result that it is possible to achieve a comparatively high drilling performance. Moreover, the service life of the components is increased by the purely symmetrically occurring loads. The bore for receiving the centering drill is preferably designed in such a way that the bore bottom serves at the same time as a stop for the centering drill end, in order to transmit the axial percussions of the drilling tool to the centering drill. This avoids a reduction in the drilling capacity, such as occurs in an embodiment having a stationary centering drill. The centering drill, including its holding means, undergoes virtually no wear in this region. Furthermore, the exchange of the mounting and/or centering drill is easily possible.

Such an arrangement can be used without difficulty both in the case of a drill crown and, for example, also in the case of known perforation drills, so that exchangeable centering drills can be used.

It is particularly advantageous, furthermore, if the recess for receiving the holding means passes completely through the drilling tool in a transverse direction. The bar-shaped or tubular holding means can thereby be removed in a simple way. At the same time, the invention provides holding means which are arranged loosely within the transverse bore. In this case, falling-out is dealt with by additional slip-over measures which prevent the holding means from escaping laterally. However, the holding means itself can also be arranged non-positively within the transverse recess or bore, preferably socalled dowel pins proving to be cost-effective. These can simply be knocked out laterally.

Various exemplary embodiments of the invention are represented in the drawings. These are explained in more detail in the following description, with further particulars and advantages of the invention being specified.

Figure 2:
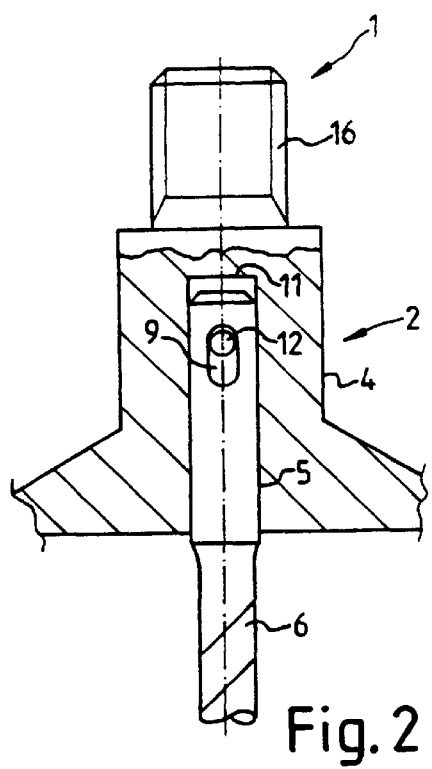
Figure 1B:
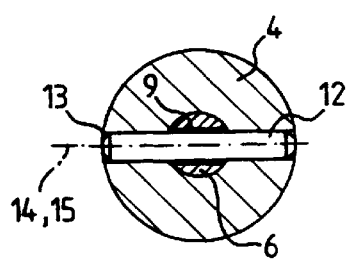
Figure 1C:
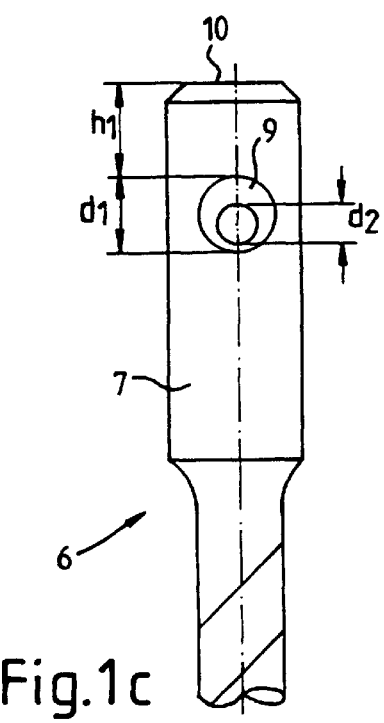
Figure 3A:
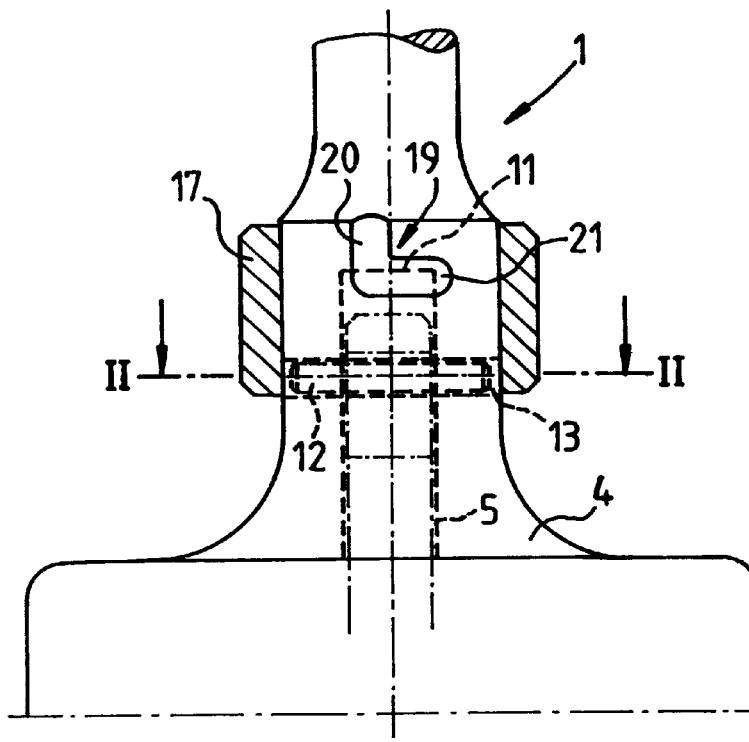
Figure 3B:
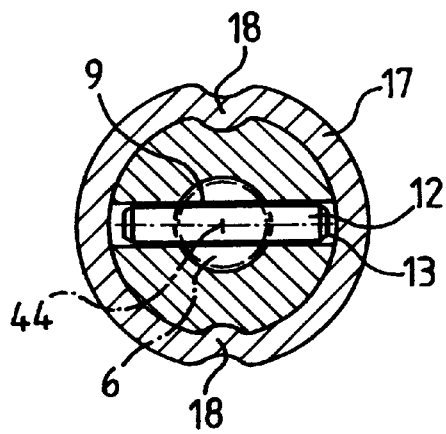
Figure 3C:
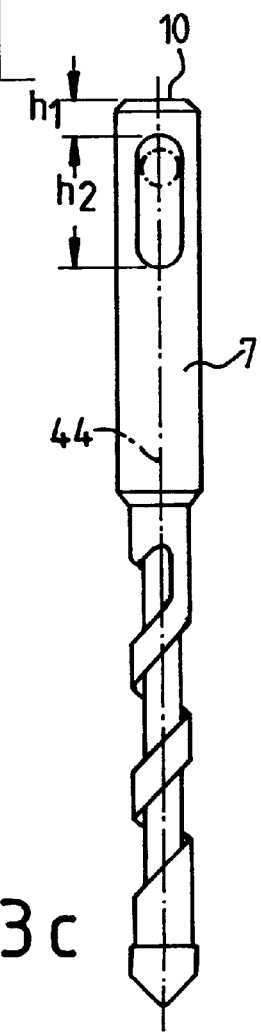
Figure 4:
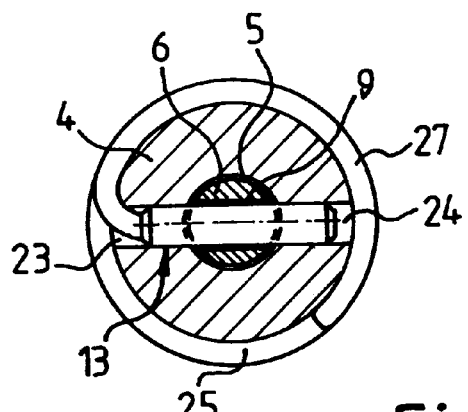
Figure 5:
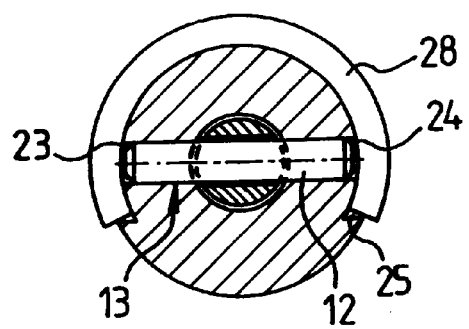
Figure 6:
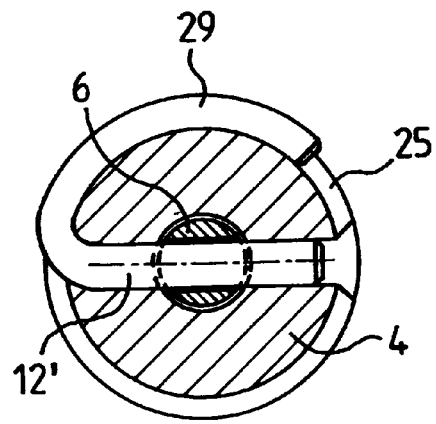
Figure 7A:
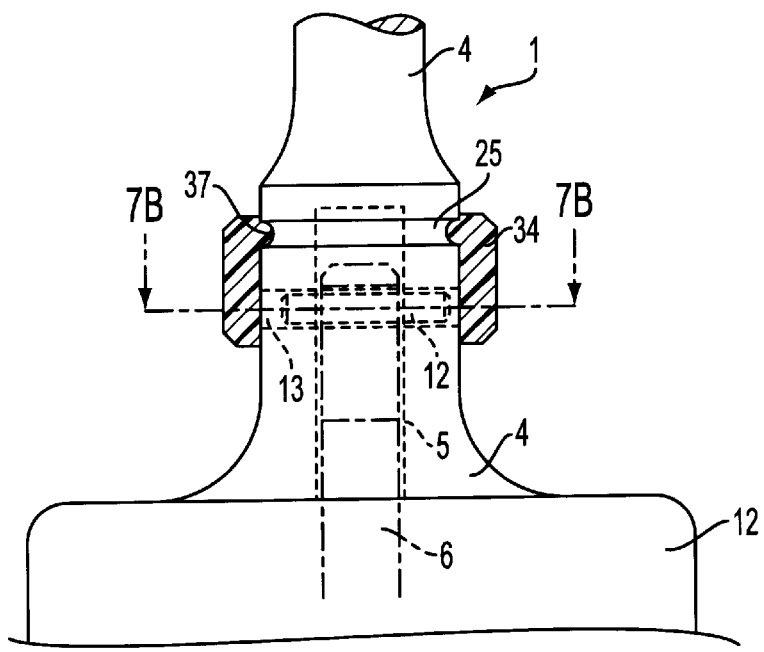
Figure 7B:
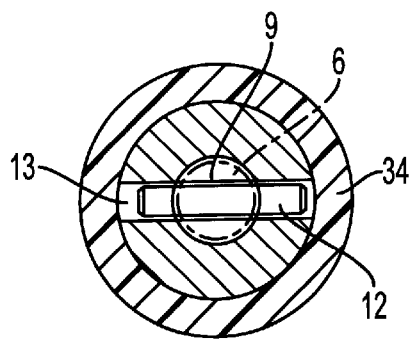
Figure 8:
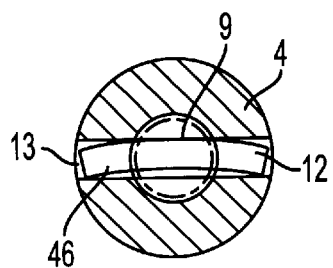
Figure 9A:
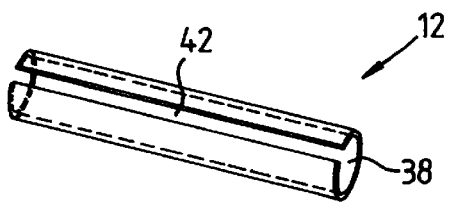
Figure 9B:
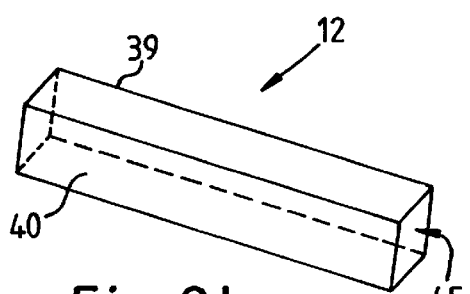
Figure 9C:
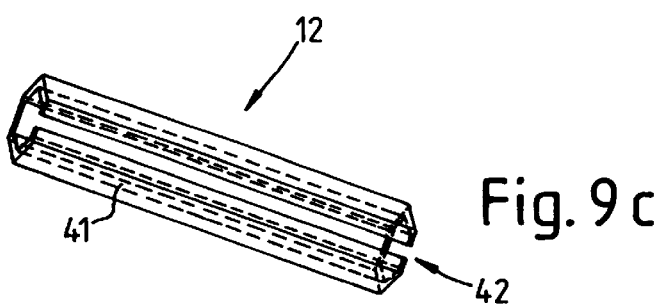

FIGS. 1a–c respectively show a first exemplary embodiment of a drilling tool designed as a drill crown, with a self-locking holding means in a partially cut side view, in a sectional representation along the sectional line I—I and in an individual representation of the centering drill, FIG. 2 shows the excerpt of a second exemplary embodiment of a drilling tool, designed as a drill crown and having a threaded attachment, in a partially cut side view, FIGS. 3a–c show a third exemplary embodiment of a drilling tool designed as a drill crown and having a loosely movable holding means and a locking ring in side view, in a sectional representation along the sectional lines II—II and in an individual representation of the centering drill, FIGS. 4–6 show three further exemplary embodiments in order to represent different securings of the holding element in the transverse bore, FIGS. 7a,b show a further exemplary embodiment of a centering drill mounting according to the invention on a drill crown, with an elastic sleeve for securing the holding element, in a side view and in a sectional top view along the sectional line A—A, FIG. 8 shows an alternative exemplary embodiment for the use of a holding means with a non-positive arrangement within the transverse bore, FIGS. 9a–c show various embodiments of bar-shaped or tubular holding means for use in one or more of the exemplary embodiments shown previously, and FIG. 10 shows a further exemplary embodiment of a drilling tool according to the invention which is designed as a perforation drill.

DESCRIPTION OF THE PREFERRED EMBODIMENTS

The present invention can, in principle, be implemented on various drilling tools, as is represented by way of example in FIGS. 1, 2, 3, 7 and 10. In particular, the mounting according to the invention of a centering drill can take place in a drill crown or also in a perforation drill having a cross-cutting head or the like.

FIGS. 1a to 1c represent a first exemplary embodiment of a drilling tool 1, comprising a drill crown 2 which is integrally connected to a shank part 4. The basic design of such a drill crown is described in DE 3,322,887. Reference is made to this.

The shank part 4 has a central bore 5 which serves for receiving a centering drill 6. The cylindrical bore 5 in the shank part 4 and the cylindrical shank part 7 of the centering drill 6 are coordinated with one another in such a way that the centering drill 6 can move axially, this being identified by the arrow 8. The centering drill 6 has a recess which passes through the shank and is located at a slight distance h1 behind the stop face 10 of the centering drill 6.

The centering drill 6 projects with its stop face 10 in the bore 5 as far as the bottom 11 of the bore 5 and, from here, is subjected to percussion stress.

So that the centering drill 6, by virtue of its axial movability, does not fall out of the bore 5 of the drilling tool 1, the centering drill is held by a bar-shaped or tubular holding means 12 which penetrates the recess 9 and is, for example, also designed as a cylindrical pin and which is located in a central transverse bore 13 in the shank part 4 of the drilling tool 1. As is evident from FIG. 1b as a section I—I through FIG. 1a, the transverse bore 13 is congruent with its bore longitudinal axis 14 to the transverse axis of symmetry 15 of the shank part 4.

Because of the fact that the diameter/height d1 of the bore 9 in the centering drill shank 7 is clearly larger in the present example than the diameter d2 of the barshaped or tubular holding means 12, the centering drill 6 can execute axial movements in a manner guided in the central bore 5. The drilling performance is improved thereby.

The aforesaid basic principle is preserved in all the exemplary embodiments described in the present invention. The form of construction of the bar-like or tubular holding means 12, which is designed, for example, as a cylindrical pin in FIGS. 1a, 1b, is different, as is the form of the penetration 9 in the centering drill shank.

The pin-like holding means according to FIGS. 1a,b is braced in the transverse bore 13 to prevent it from falling out laterally. This can be performed in many ways, and is described in detail further below (FIGS. 8 and 9).

FIG. 2 represents a second exemplary embodiment of a drilling tool designed as a drill crown 2 and having an inserted centering drill 6, in a partially cut side view and as an excerpt. By contrast with the first exemplary embodiment, the recess 9 is not designed as a bore whose diameter d1 is larger than the diameter d2 of the holding means 12, but as a slot-shaped recess. Consequently, as in the first exemplary embodiment, when guided into the bore 5 the centering drill 6 has an axial play, which is limited on the one hand by the bottom 11 of the bore 5, and on the other hand by the holding means 12. In FIG. 2, the centering drill 6 strikes at the holding means 12. As a further difference from the exemplary embodiment 1, the embodiment according to FIG. 2 has a threaded attachment 16 onto which it is possible to screw, for example, a boring bar (not represented).

A third exemplary embodiment is represented in FIGS. 3a–3b. This embodiment, as well, is based on the same fundamental principle according to the invention. Identical parts are therefore provided with identical reference symbols as appropriate.

The axial ability of the centering drill 6 to move is represented for this embodiment in the same way as in FIG. 2, being achieved by a recess 9 which is slot-shaped, and penetrates the shank 7, which is located at a distance h1 behind the stop surface 10 of the centering drill 6, and extends over the height segment h2.

The pin-like holding means 12 according to FIGS. 3a, b is mounted with play in the transverse bore 13, so that falling out laterally is prevented by the locking ring 17. The locking ring 17 covers the transverse bore 13 and is pushed onto the cylindrical shank part 4. For the retention of the locking ring 17, the latter has a bead 18 which cooperates with an angled groove 19 in a bayonet-like manner. For this purpose, the bead 18 is first rotated downward via a vertical groove part 20 and then into a horizontal groove part 21. The groove depth of the horizontal groove part 21 can decrease in the direction of the groove end, with the result that the bead 18 is jammed.

The further FIGS. 4 to 6 represent three different exemplary embodiments having a centering drill mounting according to the invention in a sectional top view, as basically corresponds to FIG. 3b. Like parts are provided, where appropriate, with the same reference symbols.

In all the exemplary embodiments according to FIGS. 4 to 6, a spring element is used to secure and position the bar-shaped or tubular holding means 12. The various spring elements are designated by reference symbols 27 to 29. In all three exemplary embodiments, the respective spring element 27 to 29 is guided in a groove 25. This prevents the respective spring element 27 to 29 from being knocked loose or released during the rotary percussion use of the drill crown.

In FIG. 4, as described with reference to FIG. 3, the centering drill 6 is positioned and secured in the bore 5 of the drilling tool 1 with longitudinal play by the pin-like holding means 12. To secure the pin-like holding means 12, the spring element 27 engages on one side into the lateral orifice 23 of the transverse bore 13, in which the holding means 12 is arranged movably, and, on the opposite side, covers the other orifice 24 of the transverse bore 13. The holding means 12 is consequently unequivocally secured against falling out. The spring element 27 guided in the groove 25 is self-locking, since it surrounds a larger region than half the circumference of the drill crown shank 4. Moreover, it is retained in its position by the end bent into the orifice 23.

FIG. 5 shows a further exemplary embodiment, it being the case that in order to secure the holding means 12 the spring element 28 engages over both openings 24, 23 of the transverse bore 13. In order to achieve retention of the spring element 28 in its position, the groove 25 is formed only in the region in which the groove receives the spring element.

FIG. 6 shows a further exemplary embodiment, in which the centering drill 6 is positioned and held by a modified pin-like holding means 12' in the shank 4, the spring element 29 being formed at one end onto the holding means 12'. In this solution too, when the centering drill 6 is being changed, the pin-like holding means 12' with formed-on spring element 29 merely has to be pulled off from the groove 25. Self-locking is achieved in that the formed-on spring element 29 extends over a sufficiently large region of the circumference of the shank 4.

In the further exemplary embodiment according to FIGS. 7a, b, the centering drill 6 is arranged in the bore 5 of the shank part 4 of a drill crown 2 and once again is positioned and held with the aid of a cylindrical holding means 12 in the transverse bore 13. The holding means 12 is positioned and secured by an elastic sleeve 34. Located once again on the drill crown shank 4 is a peripheral groove 25 which positions and secures the elastic sleeve 34 on the shank in a suitable way. For this purpose, the elastic sleeve 34 has a correspondingly adapted, likewise peripheral elevation 37 which cooperates with the groove 25. As also in the exemplary embodiments described previously, when the centering drill 6 is being inserted into the bore 5 the penetration on the centering drill shank 7 is twisted in such a way that the pin-like holding means 12 can be introduced into the recess 13. It is thereafter necessary merely to slip the elastic sleeve 34 over the shank 4 of the drilling tool 1 from above, elevation 37 fitting positively into the groove 25 in the shank 4. With this type of fastening according to the invention too, it is possible to insert the centering drill 6 and exchange it for a new one entirely without a tool.

FIG. 8 shows a further exemplary embodiment with a centering drill 6 which is positioned and secured by a further cylindrical holding means 12. The particular feature of this embodiment is that the holding means is intrinsically curved and is therefore braced in the transverse bore 13. Admittedly, the use of this holding means 12 necessitates a tool, such as, for example, a hammer or a punch. In return, no additional securing elements are required for the holding means 12. The curved holding means is capable of absorbing the forces occurring in the centering drill 6 which, once again, is penetrated in its recess 9 by the holding means, in order to bring about axial securing and rotational takeup. The remaining design and mode of operation correspond to the exemplary embodiments described previously.

FIGS. 9a to 9c represent further alternative embodiments of the bar-shaped or tubular holding means 12. In FIGS. 3a to 7b, this holding means is formed from solid material essentially as a pin-like cylindrical holding means. In this case, this cylindrical pin is inserted with play into the respective bore 13 and is secured against falling out by additional measures located on the outside of the shank 4. Furthermore, FIG. 8 shows a slightly curved cylindrical holding means 12 which is jammed in the bore 13 as a result of its longitudinal axis 46 having a curvature.

The holding means 12 represented in FIG. 9a is a tubular holding means 12 and, in particular, a conventional dowel pin 38 according to DIN 1481 or DIN 6365. Dowel pins of this type are extremely cost-effective and, by virtue of their longitudinal slot 42, can be inserted into the transverse bore 13 non-positively and/or positively. The longitudinal slot 42 makes it possible to reduce the outside diameter when such a holding means is knocked in, so that non-positive bracing in the respective transverse bore 13 occurs.

FIG. 9b represents a right-parallelepipedic holding means 12, the bar-shaped right parallelepiped 39 of which has a square cross section 45 in longitudinal section. In this case, the transverse bore 13 can likewise have a square cross section adapted to this. On such an embodiment, the large-area bearing of a longitudinal side 40 of the right parallelepiped 39 against, for example, a plane region of a slot-shaped recess 9 of the centering drill 6 is advantageous in comparison with only linear contact in the case of a cylindrical holding means 12.

Finally, FIG. 9c shows a tubular holding means 12 which is designed as a polygonal body 41. Here, the basic notion of the dowel pin 38 represented in FIG. 9a is combined with the large-area bearing, described with reference to FIG. 9b, against a plane region of a slot-shaped recess 9 of the shank part 7 of the respective centering drill 6. In this case, of course, the transverse bore 13 can likewise be made cylindrical, this being fundamentally possible also in the exemplary embodiment according to FIG. 9b having the right-parallelepipedic holding means. As in FIG. 9a, the polygonal body 41 having a polygon-like and especially hexagonal cross section is made tubular with a longitudinal slot 42 for the purpose of bracing.

Figure 10:
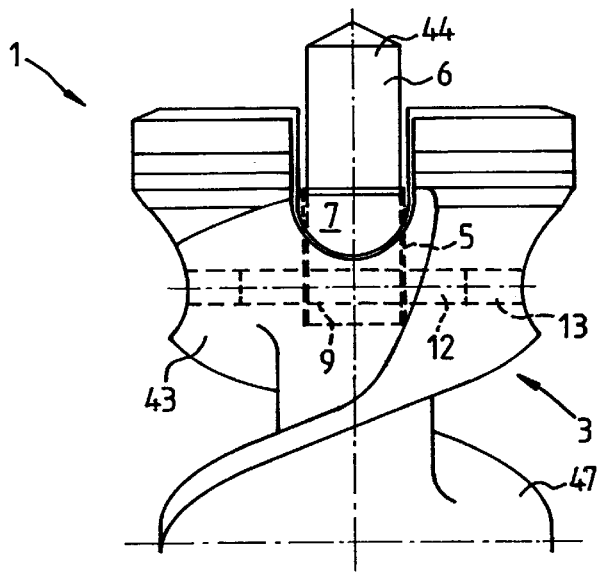

Finally, FIG. 10 shows an exemplary embodiment of the invention having a drilling tool 1 designed as a perforation drill 3, with an exchangeable centering drill 6.

The exemplary embodiment according to FIG. 10 corresponds in its more detailed design to a drilling tool, such as is shown by way of example in the applicant's DE 4,236,553. Reference is herewith made expressly to this description of the drilling tool. The form in which the centering drill is arranged on the tool is left undecided there.

For securing and positioning a centering drill 6 insertable exchangeably in such a tool, the drill head 43 once again has a suitable transverse bore 13 which is located in the transitional region between the drill head 43 and conveying helix 47 and into which preferably a self-locking holding means 12 is inserted. Embodiments especially according to FIGS. 8, 9a and 9c can be used as a self-locking holding means.

In principle, the self-locking holding means 12 once again cooperates with a recess 9 of shank part 7 of the centering drill 6, the recess 9 being arranged centrally relative to the drill longitudinal axis 44 in the same way as previously described. Positioning and fastening of the holding means likewise take place in the way previously described.

What is claimed is:

1. A drilling tool for drilling in a drilling direction, comprising:
   a drilling body having a drilling side, a first longitudinal central axis and a first recess passing through the drilling body and extending transversely relative to the drilling direction;
   cutting bits disposed on the drilling side of the drilling body;
   an axial bore in the drilling body;
   a centering drill having a centering drill shank received in the axial bore; and
   holding means for securing and positioning the centering drill in the bore and having a second longitudinal central axis,
   wherein the holding means extends in the first recess of the drilling body and penetrates the drilling tool and into the bore, so that the longitudinal second central axis of the holding means is transverse to and intersects the first longitudinal central axis of the drilling body, and wherein the centering drill shank has a second recess which completely passes through the shank to receive the holding means and is shaped so that the centering drill is movable relative to the drilling body in the axial direction.

2. The drilling tool as claimed in claim 1, wherein the drilling tool comprises one of a drill crown with a drill crown shank, a perforation drill, and a cross-drilling head.

3. The drilling tool as claimed in claim 1, wherein the axial bore that receives the centering drill has a bore bottom which serves as a stop for an end of the centering drill, thereby putting the centering drill under percussion stress.

4. The drilling tool as claimed in claim 1, wherein the drilling tool comprises one of a tool shank, a drilling head, a transitional region near a drilling head, and a transitional region between a drill head and a conveying helix, and wherein the first recess completely passes through one of the tool shank, the drilling head, the transitional region near the drill head and the transitional region between the drill head (43) and the conveying helix.

5. The drilling tool as claimed in claim 1, wherein the holding means is one of bar-shaped, pin-like, and tubular in shape and is arranged to be one of movably, braceably and self-lockingly, disposed in the first recess.

6. The drilling tool as claimed in claim 5, further comprising a spring element for positioning and securing the holding means on one of a shank of a drill crown and a transition between the drill head and a conveying helix of a perforation drill.

7. The drilling tool as claimed in claim 6, wherein an at least partially peripheral groove is provided on the outside of the shank of the drill crown for positioning the spring element.

8. The drilling tool as claimed in claim 6, wherein the spring element can be mounted and demounted without a tool.

9. The drilling tool as claimed in claim 5, wherein an at least partially closed locking ring is provided on a shank of a drill crown for positioning and securing the holding means.

10. The drilling tool according to claim 9, wherein the locking ring has an elevation which is retained in a groove provided on the shank.

11. The drilling tool as claimed in claim 9, wherein the the locking ring can be mounted and demounted without using a tool.

12. The drilling tool as claimed in claim 1, wherein the drilling tool being provided on a shank of a drill further comprising an elastic sleeve having at least one elevation which engages into a groove provided on the shank to position and secure the sleeve of the drilling body.

13. The drilling tool as claims in claim 12, wherein the groove extends around the shank and at a different location from the first recess for receiving the holding means.

14. The drilling tool as claimed in claim 1, wherein the holding means comprises a cylindrical pin which is curved relative to the longitudinal axis thereof and which is inserted so as to be braced in the first recess.

15. The drilling tool as claimed in claim 14, wherein the holding means having a polygonal cross section.

16. The drilling tool according to claims 15, wherein the holding means has a longitudinal slot.

17. The drilling tool as claimed in claim 1, wherein the holding means comprises one of a tubular pin and a longitudinally slotted cylindrical pin, and is inserted loosely or braceably in the first recess.

18. The drilling tool as claimed in claim 1, wherein the holding means comprises a dowel pin.

19. The drilling tool according to claim 18, wherein the holding means has a longitudinal slot.

20. The drilling tool as claimed in claim 1, wherein the second recess has a height which is larger than an axial stroke length of the percussion movement of the centering drill.

21. The drilling tool as claims in claim 1, wherein the second recess is slot-shaped.

22. The drilling tool according to claim 1, wherein the second recess has a diameter dimensioned such that the holding means extends through the second recess with play.

* * * * *